United States Patent
Oyama

(10) Patent No.: US 9,227,634 B2
(45) Date of Patent: Jan. 5, 2016

(54) LANE KEEPING CONTROL SYSTEM FOR VEHICLE

(71) Applicant: FUJI JUKOGYO KABUSHIKI KAISHA, Tokyo (JP)

(72) Inventor: Hajime Oyama, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/477,636

(22) Filed: Sep. 4, 2014

(65) Prior Publication Data

US 2015/0094915 A1  Apr. 2, 2015

(30) Foreign Application Priority Data

Sep. 27, 2013  (JP) .................................. 2013-202059

(51) Int. Cl.

| | | |
|---|---|---|
| *B60W 30/10* | (2006.01) | |
| *B62D 1/00* | (2006.01) | |
| *B62D 6/00* | (2006.01) | |
| *B60W 30/12* | (2006.01) | |
| *B62D 15/02* | (2006.01) | |

(52) U.S. Cl.
CPC ............. *B60W 30/12* (2013.01); *B62D 15/025* (2013.01)

(58) Field of Classification Search
USPC .......................................................... 701/42
See application file for complete search history.

(56) References Cited

U.S. PATENT DOCUMENTS

| | | | |
|---|---|---|---|
| 6,308,123 B1 * | 10/2001 | Ikegaya et al. ................... 701/41 |
| 6,487,501 B1 * | 11/2002 | Jeon .............................. 701/301 |
| 6,489,887 B2 * | 12/2002 | Satoh et al. .................... 340/436 |
| 6,970,777 B2 * | 11/2005 | Tange et al. ...................... 701/41 |
| 7,236,884 B2 * | 6/2007 | Matsumoto et al. ........... 701/300 |
| 9,045,118 B2 * | 6/2015 | Taguchi et al. |
| 2002/0041229 A1 * | 4/2002 | Satoh et al. .................... 340/438 |
| 2002/0188404 A1 * | 12/2002 | Jeon .............................. 701/301 |
| 2003/0045982 A1 * | 3/2003 | Kondo et al. .................... 701/41 |
| 2003/0045983 A1 * | 3/2003 | Kondo et al. .................... 701/41 |
| 2010/0211235 A1 * | 8/2010 | Taguchi et al. .................... 701/1 |
| 2015/0183460 A1 * | 7/2015 | Oyama |

FOREIGN PATENT DOCUMENTS

JP       2007-125959 A    5/2007

* cited by examiner

*Primary Examiner* — Yonel Beaulieu

(74) *Attorney, Agent, or Firm* — McDermott Will & Emery LLP

(57) ABSTRACT

A vehicle lane keeping control system calculates a feedforward control amount on the basis of a vehicle traveling path, calculates a first positional deviation amount between a vehicle and a target course at a first forward attention point when the vehicle travels in a straight line to the first forward attention point if a steering torque exceeds a threshold value, calculates a first lateral position feedback control amount, calculates an amount of deviation between an estimated vehicle traveling path and the target course at a second forward attention point remote from the first forward attention point if the first lateral position feedback control amount is lower than the threshold value, calculates a second lateral position feedback control amount, and calculates an electric motor current value by using at least the feedforward control amount and one of the first and second lateral position feedback amounts.

8 Claims, 7 Drawing Sheets

LANE KEEPING CONTROL SYSTEM FOR VEHICLE

CROSS-REFERENCE TO RELATED APPLICATIONS

The present application claims priority from Japanese Patent Application No. 2013-202059 filed on Sep. 27, 2013, the entire contents of which are hereby incorporated by reference.

BACKGROUND

1. Technical Field

The present invention relates to a lane keeping control system that causes a vehicle to travel along a predetermined target course by driving an electric power steering motor.

2. Related Art

Recently, in order to reduce traffic accidents and driver's load, techniques concerning various lane keeping control systems that assist and control a steering operation to cause a vehicle to travel along a predetermined target course have been developed and proposed. For instance, Japanese Unexamined Patent Application Publication (JP-A) No. 2007-125959 discloses a steering system for a vehicle. Specifically, the steering system for the vehicle receives data on a target course and has a driver model that estimates a driver steering input necessary for the vehicle to travel along a target course on the basis of a predetermined driver steering characteristic. The steering system determines a steering assistance amount by adding a feedforward steering assistance amount, which is obtained by multiplying an estimated driver steering input by a feedforward gain, to a feedback steering assistance amount, which is obtained by multiplying an amount of positional deviation between the vehicle traveling course and the target course by a feedback gain, and by weighting the feedforward gain to be larger than the feedback gain when the positional deviation is large and weighting the feedback gain to be larger than the feedforward gain when the positional deviation is small.

There are various driver steering conditions when a driver overrides the lane keeping control system for the vehicle. Therefore, if the driver overrides the system using a vehicle steering device disclosed in JP-A No. 2007-125959, in which the vehicle steering device performs feedforward control and feedback control while changing the weighting therebetween on the basis of an amount of positional deviation between the target course and the vehicle traveling course, the lane keeping control system might not satisfactorily response to the driver's steering operation. That is, it is required that a vehicle steering device perform precise lane keeping control in the case where the driver substantially entrusts control of the vehicle to the vehicle steering device, however, when the driver applies a steering input to the steering device, it is required that the lane keeping control continue without excessively interfering with a driver's steering intention. If the lane keeping control system controls against the driver's steering intention, there is a possibility that the driver may feel discomfort.

There are also various characteristics of feedback control. If a distance from a present vehicle position to a forward attention point (a point at which a deviation is calculated) is set to be short, the system promptly controls the vehicle to follow the target course by observing a position immediately in front of the vehicle. In such a case, tracking performance for the target course becomes good, but controllability of a target steering angle and vehicle behavior becomes worse in sensitivity and stability since the system mainly responds to a current lateral deviation alone. In contrast, if the distance from the present vehicle position to the forward attention point is set to be long, the vehicle has only to return to the target course before the vehicle reaches the far forward attention point. Although the tracking performance for the target course becomes worse, controllability of a target steering angle and vehicle behavior becomes good in stability since the system can perform a predictive control in consideration of the orientation of the vehicle with respect to the target course, and rate of change (yaw rate) of the orientation as well as the lateral deviation from the target course. As described above, when the driving assistance control is performed in the forward attention model, it is necessary to suitably set the feedback control so as to balance between the tracking performance to the target course and the stability of the vehicle behavior.

SUMMARY OF THE INVENTION

In view of the above problems, it is an object of the invention to provide a lane keeping system for a vehicle that can perform lane keeping control in which; precise and stable control can be performed when a driver entrusts a steering operation of a vehicle to the system; the control can continue without excessively interfering with a driver's steering intention when the driver applies a steering input to the system; and a balance between a rapid target course tracking performance and stable vehicle behavior can be kept preferably when the vehicle travels on the target course.

An aspect according to the invention is directed to a lane keeping control system for a vehicle. The system sets a target course on which the vehicle travels, calculates a control amount for an electric power steering motor on the basis of at least an amount of deviation between a traveling path of the vehicle and the target course, and controls the vehicle so as to travel along the target course. The system includes: a first feedback controller that calculates, as a first positional deviation amount, an amount of deviation between the traveling path of the vehicle and the target course at a predetermined first forward attention point when the vehicle travels in a straight line to the predetermined first forward attention point, and that calculates the control amount for the vehicle which travels along the target course in response to the first positional deviation amount; a second feedback controller that estimates a traveling path of the vehicle, that calculates, as a second positional deviation amount, an amount of deviation between the estimated traveling path of the vehicle and the target course at a predetermined second forward attention point, and that calculates the control amount for the vehicle which travels along the target course in response to the second positional deviation amount; and a control selector that selects one of the control amount calculated by the first feedback control unit and the control amount calculated by the second feedback control unit in response to a driver's steering intention.

DETAILED DESCRIPTION

Figure 1:
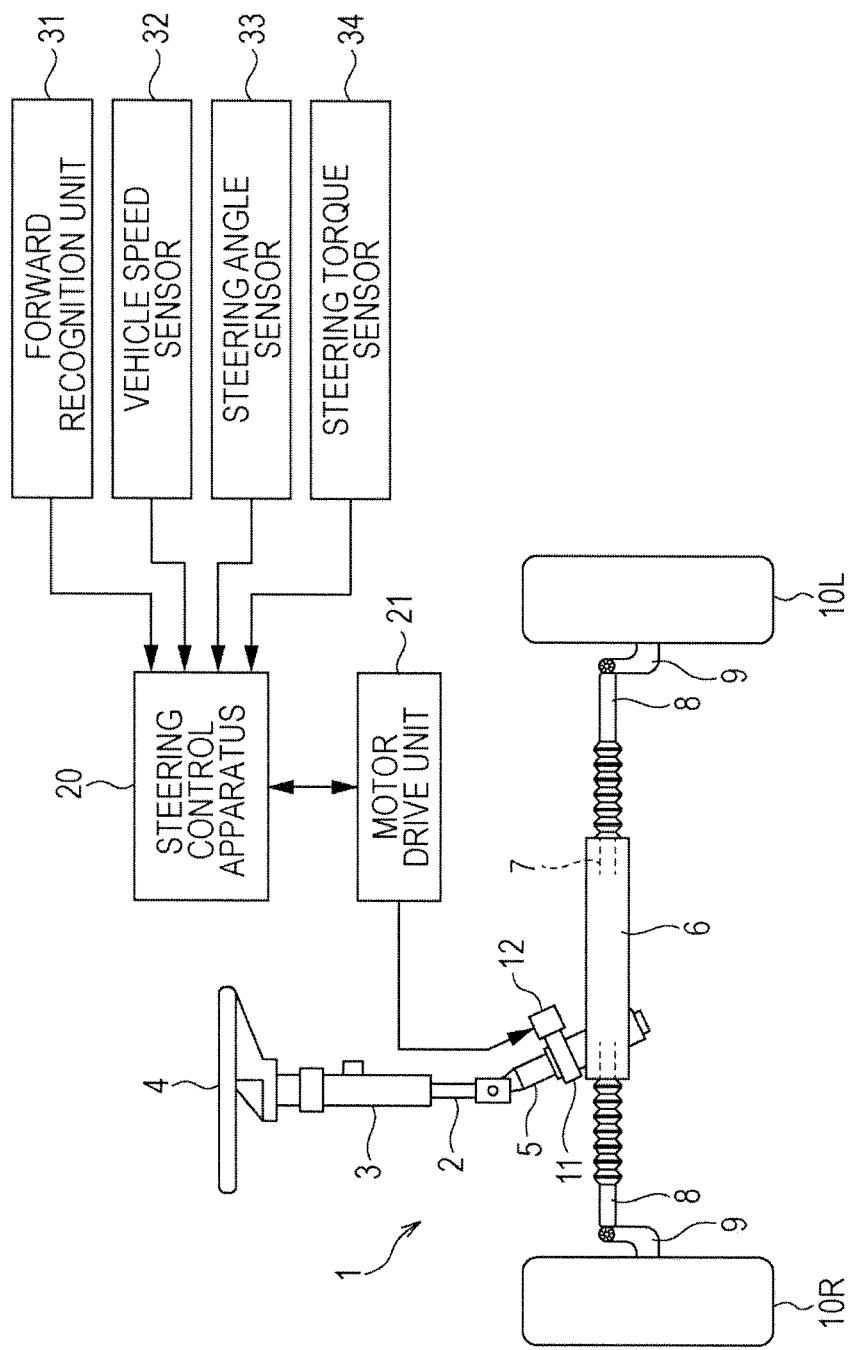
FIG. 1 is a configuration explanatory view of a vehicle steering system according to an example of the invention.

Referring now to the drawings, an example of the invention will be described below.

In FIG. 1, an electric power steering apparatus 1 can freely set a steering angle independently of a driver input. The electric power steering apparatus 1 includes a steering shaft 2 supported rotatably on a vehicle frame (not shown) through a steering column 3. An end of the steering shaft 2 extends toward a driver seat while the other end of the steering shaft 2 extends toward an engine compartment. A steering wheel 4 is secured to the end of the steering shaft 2 on the driver seat side while a pinion shaft 5 is connected to the other end of the steering shaft 2 on the engine compartment side.

A steering gear box 6 that extends in a vehicle width direction is located in the engine compartment. A rack shaft 7 is slidably inserted into the steering gear box 6. A pinion (not shown) formed on the pinion shaft 5 meshes with a rack (not shown) formed on the rack shaft 7. Thus, a rack and pinion type steering gear mechanism is formed.

Right and left ends of the rack shaft 7 project from ends of the steering gear box 6, respectively. A front knuckle 9 is connected through a tie rod 8 to each end of the rack shaft 7. The front knuckles 9 rotatably support right and left wheels 10R and 10L that act as traveling wheels and are pivotally supported on a vehicle body frame. Accordingly, when the steering wheel 4 rotates the steering shaft 2 and the pinion shaft 5, the rack shaft 7 is moved in right and left directions by rotation of the pinion shaft 5, the front knuckles 9 pivot around kingpins (not shown) as a result of movement of the rack shaft 7, and the right and left wheels 10R and 10L are steered in the right and left directions.

An electric power steering motor (an electric motor) 12 is coupled through an assistance transmission mechanism 11 to the pinion shaft 5. The electric motor 12 applies to the assistance transmission mechanism 11 a steering torque that assists a steering torque to be applied to the steering wheel 4 and that assists a steering torque so as to become a predetermined steering torque (a target steering torque). A later-described steering control apparatus 20 applies a target current value Icmd, that is, a control output value to a motor drive unit 21 and the electric motor 12 is driven by the motor drive unit 21.

The steering control apparatus 20 is connected to a forward recognition unit 31 that recognizes a travelling road shape by detecting right and left lane lines in front of the vehicle and obtaining lane line position information. Also, the steering control apparatus 20 is connected to a vehicle speed sensor 32 that detects a vehicle speed V, a steering angle sensor 33 that detects a steering angle (a real steering angle) θp, and a steering torque sensor 34 that detects a steering torque Td.

The forward recognition unit 31 includes, for instance, a pair of CCD cameras (not shown) that are attached to a front part of a ceiling in a vehicle cabin and are separated from each other by a certain distance so as to obtain a stereo image of an object outside the vehicle from different points of view, and a stereo image processing unit (not shown) that performs processing on image data from the CCD cameras.

The processing of the image data obtained from the CCD cameras in the forward recognition unit 31 is performed as follows: firstly, distance information is obtained based on an amount of positional deviation between a pair of stereo images obtained by the CCD cameras in a travelling direction of the vehicle, and a distance image is generated.

Figure 6:
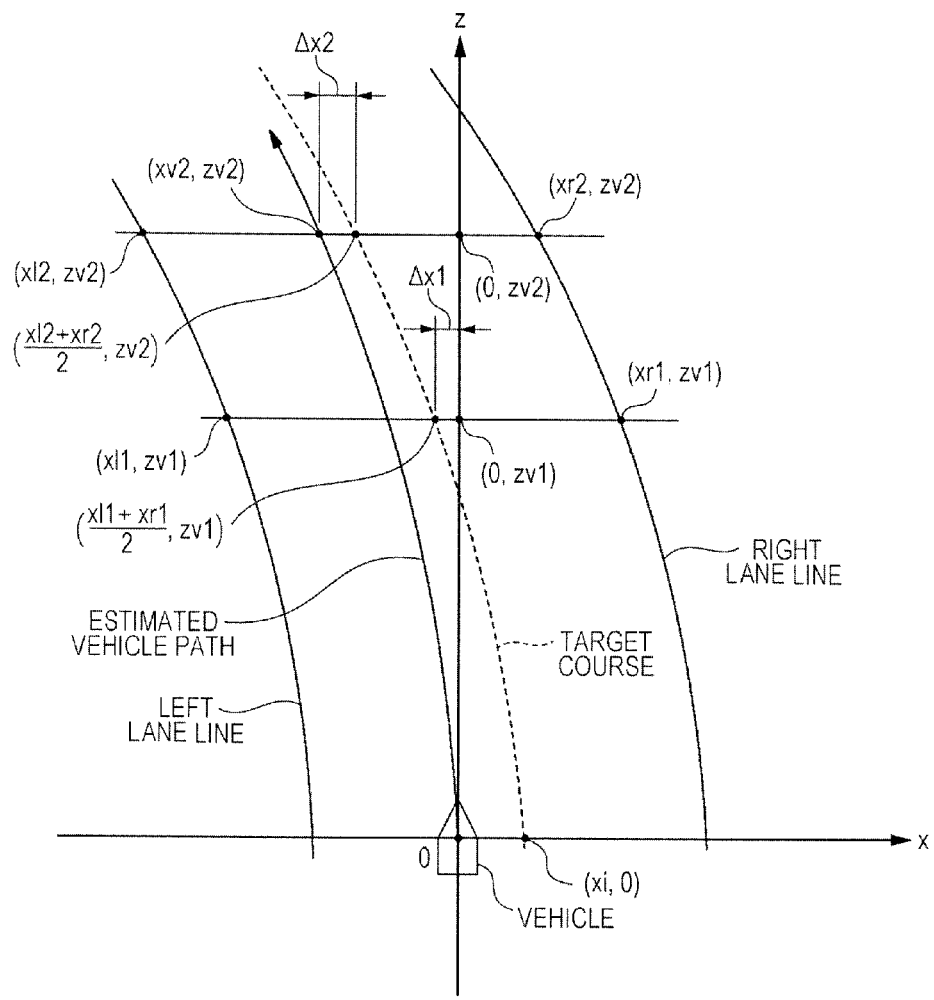
FIG. 6 is an explanatory view of first lateral position feedback control and second lateral position feedback control according to the example of the invention.

In a process of recognizing the lane line data, since it is known that the lane lines have luminance higher than that of the road face, the change in luminance in the width direction of the road is evaluated to identify positions of the right and left lane lines on the image plane are identified on the image plane. Specifically, positions (x, y, z) of the lane lines in real space are calculated by a well-known coordinate transformation equation in accordance with positions (i, j) on the image plane and parallax calculated on the basis of the positions, that is, distance information. In the present example, as illustrated in FIG. 6, the real-space coordinate system is set with reference to the position of the vehicle, and includes an x-axis in the width direction of the vehicle, a y-axis in a height direction of the vehicle, and a z-axis in a lengthwise direction of the vehicle (a distance direction) while a road face immediately below the center position between the stereo cameras is set to be the origin.

The x-z plane (y=0) matches the road face, if the road is flat. A road model is illustrated by dividing a travelling lane of the vehicle on the road into multiple sections in the distance direction and by approximately coupling the right and left lane lines for the respective sections. In the present example, the shape of the travelling road is recognized by the pair of CCD cameras in the example of the invention. Alternatively, a monocular camera or a color camera may be used to obtain image information.

The steering control apparatus 20 calculates a feedforward control amount Iff of the electric motor 12 necessary for the vehicle to travel along a target course (an intermediate area between the right and left lane lines) in response to the respective input signals by feedforward control on the basis of the shape of the travelling road. In the case where the steering torque Td exerted by the driver, as a driver's steering intention, exceeds a predetermined threshold value, a first feedback control is selected. For the first feedback control, when the vehicle moves straight to a first forward attention point previously set, an amount of positional deviation between the vehicle and the target course at the first forward attention point is calculated as a first positional deviation amount Δx1. In response to the first positional deviation amount Δx1, a control amount Ifb1 (a first lateral feedback control amount) is calculated in which the vehicle travels along the target course. In the case where the steering torque exerted by the driver is lower than the predetermined threshold value, a second feedback control is selected. For the second feedback control, a vehicle traveling path of the vehicle is estimated. An amount of positional deviation between the estimated vehicle traveling path and the target course is calculated as a second positional deviation amount Δx2 at a second forward attention point which is previously set remote from the first forward attention point. A control amount Ifb2 (a second lateral feedback control amount) is calculated in which the vehicle travels along the target course in response to the first positional deviation amount Δx1. An electric motor current value Icmd is calculated by using at least one of the feedforward control amount Iff and the selected feedback control value (one of the Ifb1 and Ifb2). The Icmd is output to the motor drive unit 21 so as to control the electric motor 12.

Figure 2:
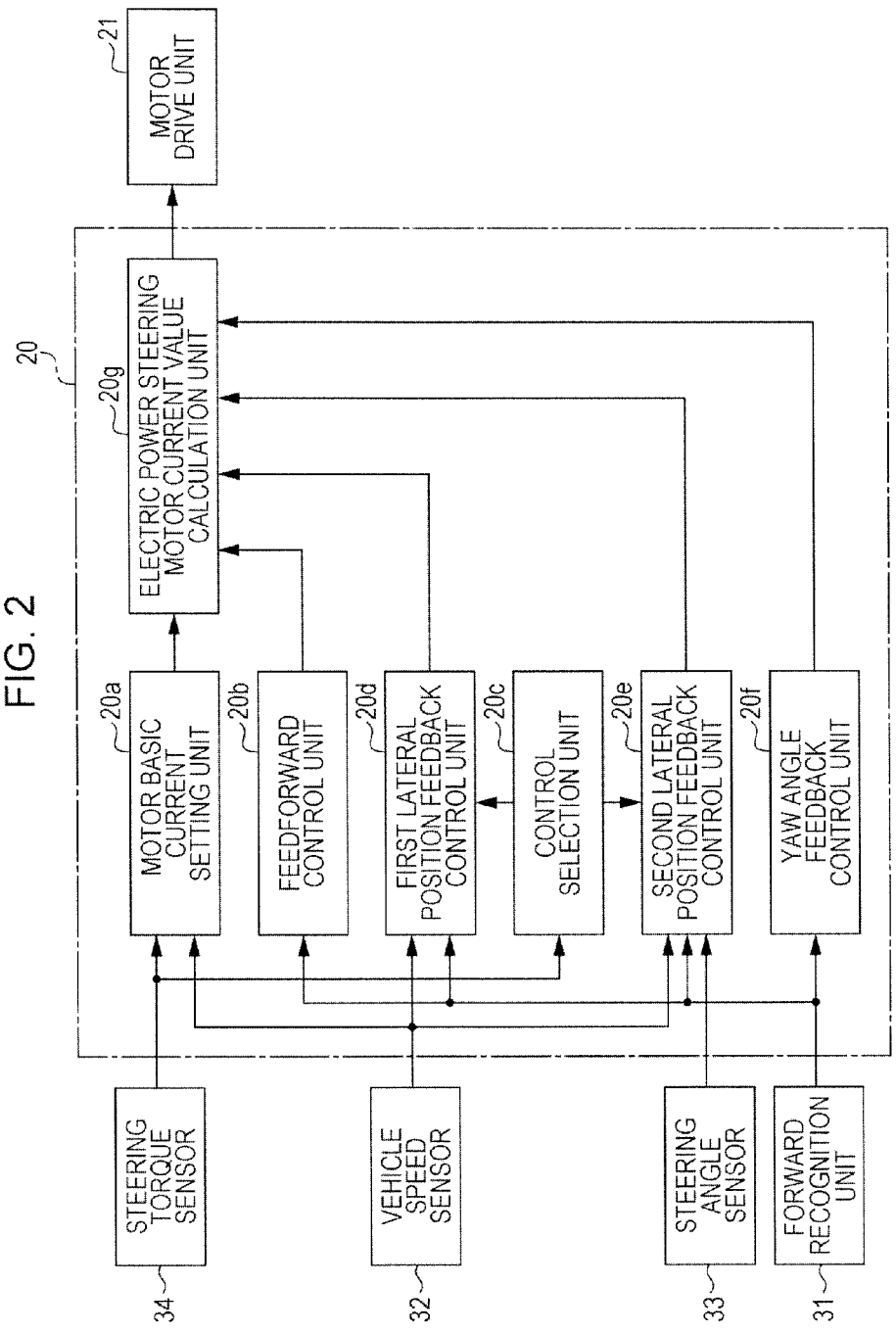
FIG. 2 is a functional block diagram of a steering control apparatus according to the example of the invention.

As illustrated in FIG. 2, the steering control apparatus 20 mainly includes a motor basic current setting unit 20a, a feedforward control unit 20b, a control selection unit 20c, a first lateral position feedback control unit 20d, a second lateral position feedback control unit 20e, a yaw angle feedback control unit 20f, and an electric power steering motor current value calculation unit 20g.

Figure 4:
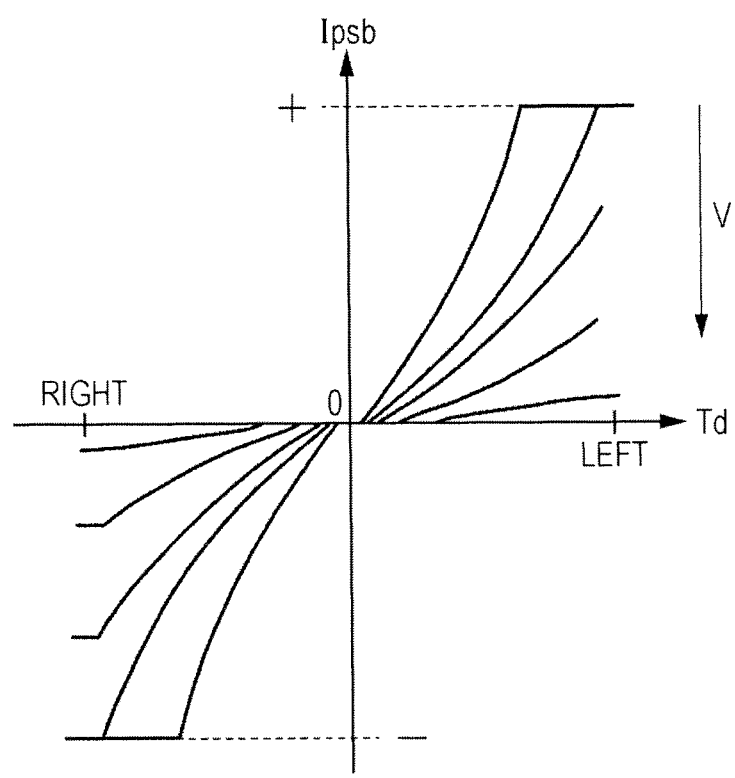
FIG. 4 is an explanatory graph that illustrates an instance of characteristic in a relationship between a steering torque of an electric power steering motor and an electric motor basic current value according to the example of the invention.

The motor basic current setting unit 20a receives a vehicle speed V from the vehicle speed sensor 32, and a steering torque Td from a steering torque sensor 34. For instance, as illustrated in FIG. 4, an electric motor basic current value Ipsb is set with reference to a predetermined characteristic map in a relationship between the steering torque TD and the basic current value Ipsb. The basic current value Ipsb is output to the electric power steering motor current value calculation unit 20g.

The feedforward control unit 20b receives image information recognized in the forward recognition unit 31. For instance, a feedforward control amount (a current value) Iff of the electric motor 12 necessary for the vehicle to travel along the target course is calculated by the equation (1) below. The feedforward control amount Iff is output to the electric power steering motor current value calculation unit 20g.

$$Iff = Giff \cdot \kappa \qquad (1)$$

Here, $\kappa$ is a vehicle traffic line curvature given by, for instance, the following equation (2):

$$\kappa = (\kappa l + \kappa r)/2 \qquad (2)$$

Figure 5:
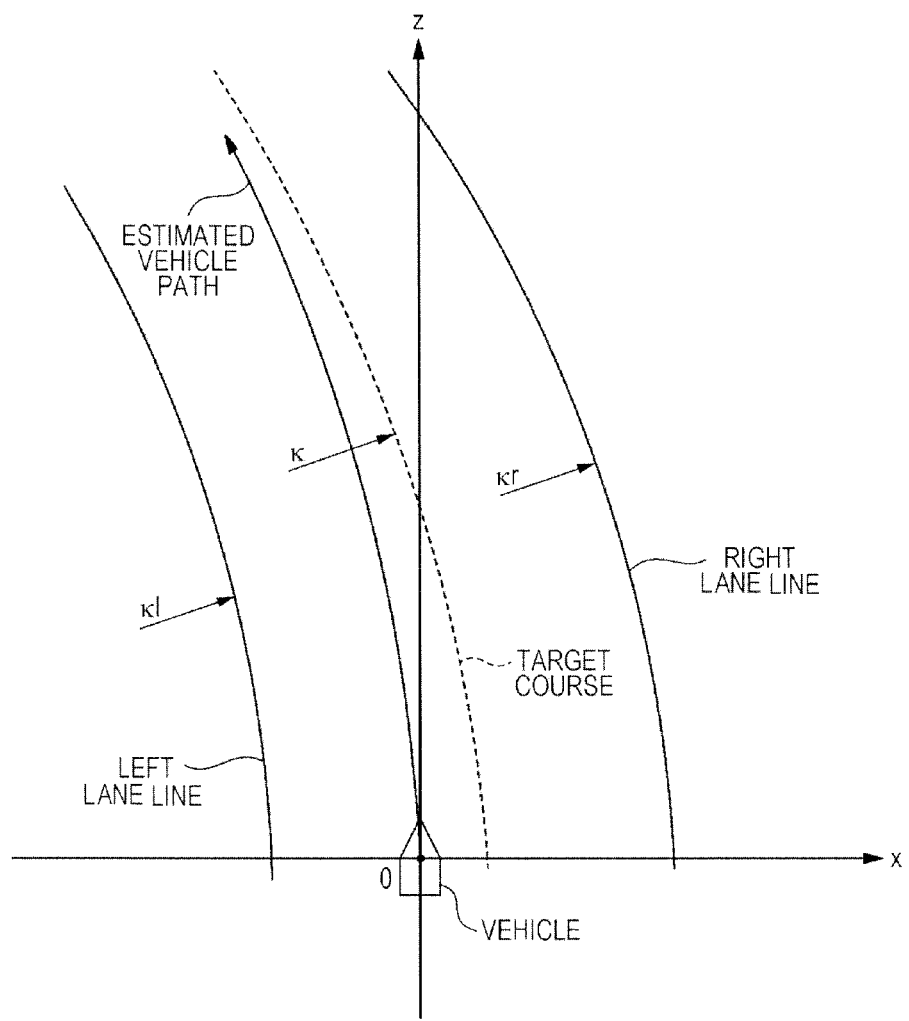
FIG. 5 is an explanatory view of feedforward control according to the example of the invention.

In the equation (2), $\kappa l$ is a curvature component of the left lane line, and $\kappa r$ is a curvature component of the right lane line (see FIG. 5). In more detail, the right and left curvatures $\kappa r$ and $\kappa l$ are determined by using a coefficient of the second term calculated by a quadric least squares method with respect to points composing the right and left lane lines. For instance, if the lane line is approximated by the quadric equation $x = A \cdot z^2 + B \cdot z + C$, the value of $2 \cdot A$ is used as the curvature component. The lane line curvature components $\kappa l$ and $\kappa r$ may be the curvatures of the respective lane lines. Giff in the equation (1) indicates a feedforward gain set previously by experimentation, calculation, or the like.

The control selection unit 20c receives the steering torque Td from the steering torque sensor 34. For instance, after a given delay processing is performed in the steering torque Td exerted by the driver, the absolute value |Td| and a threshold value Ktd set previously are compared with each other. If the absolute value |Td| is smaller than the Ktd (|Td|<Ktd) and the driver's steering intention seems to be at a low level, a switching flag F is set to be zero (F=0) and is output to the first lateral position feedback control unit 20d and the second lateral position feedback control unit 20e. In contrast, if the absolute value |Td| is larger than or equal to the Ktd (|Td|≥Ktd) and the driver's steering intention seems to be in the range of a high level to a middle level, the switching flag F is set to be one (F=1) and is output to the first lateral position feedback control unit 20d and the second lateral position feedback control unit 20e.

The first lateral position feedback control unit 20d receives the recognized image information from the forward recognition unit 31, the vehicle speed V from the vehicle speed sensor 32, and the switching flag F from the control selection unit 20c. If the switching flag F (F=1) is output to the unit 20d (if the driver's steering intention is in the range of a high level to a middle level), the first lateral position feedback control amount (the current value) Ifb1 is calculated by the equation (3) below. The first lateral position feedback control amount Ifb1 is output to the electric power steering motor current value calculation unit 20g as a lateral position feedback control amount Ifb.

$$Ifb1 = Gifb1 \cdot \Delta x1 \qquad (3)$$

Here, Gifb1 is the first lateral position feedback gain set previously by experimentation, calculation, or the like. $\Delta x1$ is an amount of deviation (a first deviation amount) between the vehicle and the target course in the first forward attention point (0, zv1) when the vehicle travels in a straight line to the first forward attention point (0, zv1), as illustrated in FIG. 6. The forward attention distance (z-coordinate) zv1 of the first forward view point (0, zv1) is calculated by the equation $zv1 = T1 \cdot V$ in the present example. T1 is a first estimated period of time set previously. For instance, T1 is set to be 0.8 seconds. In the present example, since the target course is located between the right and left lane lines, the equation $\Delta x1 = (xl1 + xr1)/2$ is established. Here, xl1 is the x-coordinate of the left lane line at the z-coordinate of the first forward attention point (0, zv1), and xr1 is the x-coordinate of the right lane line at the z-coordinate of the first forward attention point (0, zv1).

The second lateral position feedback control unit 20e receives the recognized image information from the forward recognition unit 31, the vehicle speed V from the vehicle speed sensor 32, a steering angle θp from the steering angle sensor 33, and the switching flag F from the control selection unit 20c. If the switching flag F (F=0) is output to the unit 20e (if the driver's steering intention is at a low level), the second lateral position feedback control amount (current value) Ifb2 is calculated by the equation (4) below. The second lateral position feedback control amount Ifb2 is output to the electric power steering motor current value calculation unit 20g as a lateral position feedback control amount Ifb.

$$Ifb2 = Gifb2 \cdot \Delta x2 \qquad (4)$$

Here, Gifb2 is a second lateral position feedback gain set previously by experimentation, calculation, or the like. $\Delta x2$ is calculated by the following equation (5), as illustrated in FIG. 6:

$$\Delta x2 = (xl2 + xr2)/2 - xv2 \qquad (5)$$

In the equation (5), xv2 is the x-coordinate of the estimated vehicle path at the z-coordinate of the second forward attention point (0, zv2) of the vehicle. In the present example, the second forward attention point (0, zv2) is set so as to be remote from the first forward attention point (0, zv1), and zv2 that is a forward attention distance (the z-coordinate) of the second forward attention point (0, zv2) is calculated by the equation $zv2 = T2 \cdot V$. Here, T2 is a second estimated period of time set previously. For instance, T2 is set to be 1.2 seconds.

Accordingly, xv2 is calculated by, for instance, the equation (6) below, in the case where vehicle specifications, vehicle inherent stability factors As, and the like are used in accordance with the travelling state of the vehicle.

$$Xv2 = (1/2) \cdot (1/(1 + As \cdot V^2)) \cdot (\theta p/Lw) \cdot (T2 \cdot V)^2 \qquad (6)$$

Here, Lw is a wheel base.

In the equation (5), xl2 is the x-coordinate of the left lane line at the z-coordinate of the second forward attention point (0, zv2) while xr2 is the x-coordinate of the right lane line in the z-coordinate of the second forward attention point (0, zv2).

That is, in the present example, in the case where the driver's steering intention is estimated to be in the range of a high level to a middle level, the first lateral position feedback control amount Ifb1 is selected as the lateral position feedback control amount Ifb by setting the switching flag F of the control selection unit 20c. The amount Ifb1 is output to the first lateral position feedback control unit 20d. In the case where the driver's steering intention is estimated to be at a low level, the second lateral position feedback control amount Ifb2 is selected as the lateral position feedback control amount Ifb by setting the switching flag F of the control selection unit 20c. The amount Ifb2 is output to the second lateral position feedback control unit 20e. Accordingly, the control selection unit 20c serves as the control selector of the present invention, the first lateral position feedback control unit 20d as the first lateral position feedback controller of the present invention, and the second lateral position feedback control unit 20e as the second lateral position feedback controller of the present invention.

The yaw angle feedback control unit 20f receives recognized image information from the forward recognition unit 31. A yaw angle feedback control amount Iby that is used to feedback-control a yaw angle of the vehicle along the target course is calculated by, for instance, the equation (7) below. The amount Iby is output to the electric power steering motor current value calculation unit 20g.

$$Ifby = Gfby \cdot (\theta tl + \theta tr)/2 \qquad (7)$$

Figure 7:
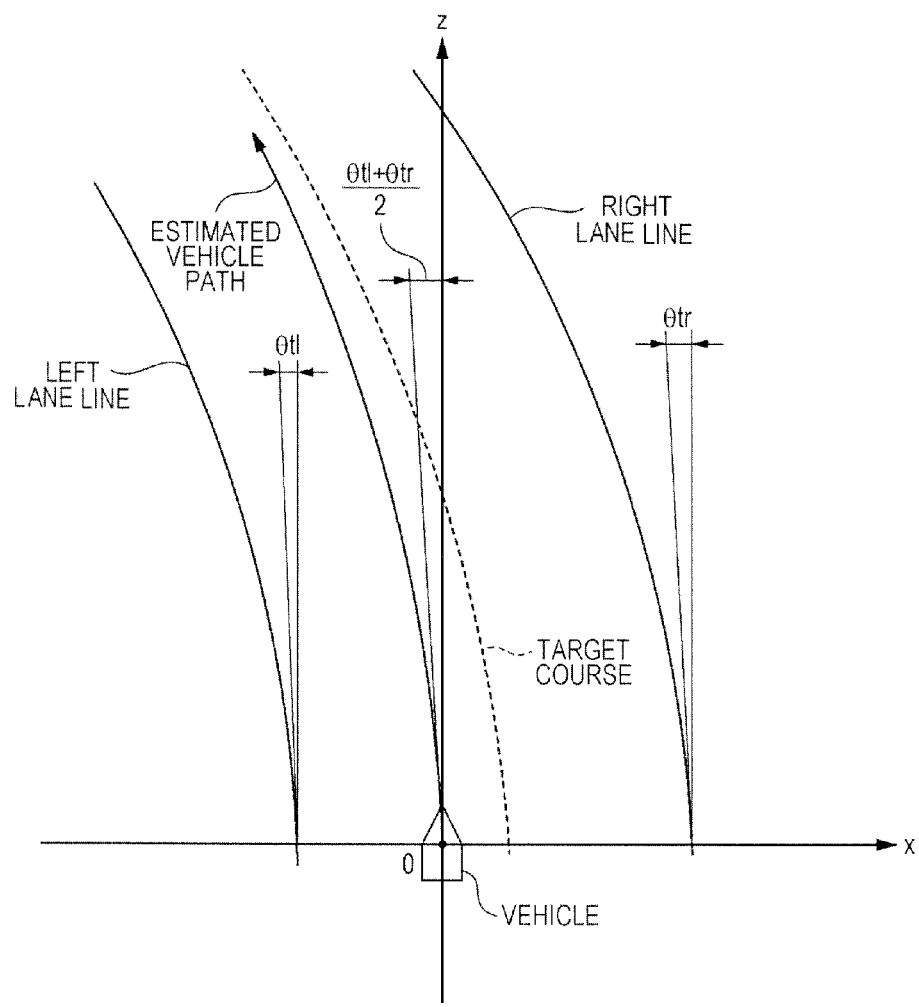
FIG. 7 is an explanatory view of yaw angle feedback control according to the example of the invention.

Here, Gfby is a gain set previously by experimentation, calculation, or the like. $\theta tl$ and $\theta tr$ are the angles between the vehicle and the left lane line and the right lane line, respectively, and determined on the basis of the image information from the forward recognition unit 31 (see FIG. 7). $\theta tl$ and $\theta tr$ may be determined by using a coefficient of the primary term calculated by, for instance, a quadric least squares method for the respective points on the lane lines obtained by the image information (that is, a value B when a lane line is approximated by the equation $x = A \cdot z^2 + B \cdot z + C$).

The electric power steering motor current value calculation unit 20g receives an electric motor basic current value Ipsb from the motor basic current setting unit 20a, a feedforward control amount Iff from the feedforward control unit 20b, the lateral position feedback control amount Ifb from one of the first lateral position feedback control unit 20d and the second lateral position feedback control unit 20e, and the yaw angle feedback control amount Ifby from the yaw angle feedback control unit 20f. The electric motor current value Icmd is calculated by the equation (8) below. The Icmd is output to the motor drive unit 21 so as to drive the electric motor 12.

$$Icmd = Iff + Ifb + Ifby \qquad (8)$$

Figure 3:
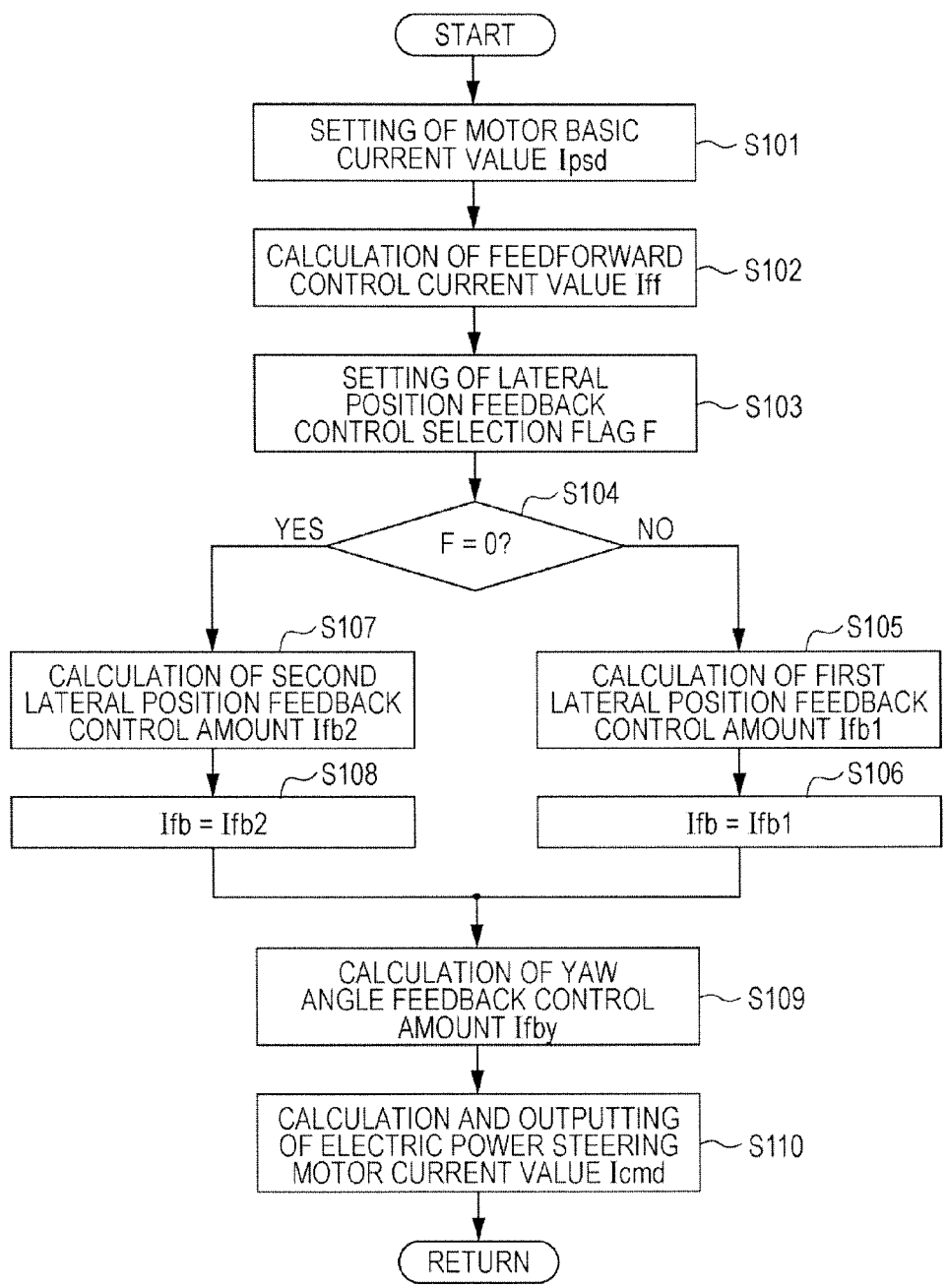
FIG. 3 is a flow chart of a lane keeping control program according to the example of the invention.

Next, lane keeping control executed in the steering control apparatus 20 mentioned above will be described by referring to FIG. 3.

Firstly, in Step 101 (hereinafter, "Step" is abridged to "S"), the motor basic current setting unit 20a sets the electric motor basic current value Ipsb with reference to the relationship between the steering torque Td of an electric power steering motor and the electric motor basic current value Ipsb. The relationship is previously set and is illustrated in, for instance, FIG. 4.

Next, the process advances to S102. In S102, the feedforward control unit 20b calculates the feedforward control amount Iff necessary for the electric motor 12 to travel along the target course by using, for instance, the equation (1) mentioned above.

Next, the process advances to S103. In S103, the control selection unit 20c compares the absolute value |Td| of the steering torque with the predetermined threshold value Ktd. If the absolute value |Td| is smaller than the threshold value Ktd (|Td|<Ktd) and the driver's steering intention is estimated to be at a low level, the switching flag F is set to be zero (0). If the absolute value |Td| is larger than or equal to the threshold value Ktd (|Td|≥Ktd) and the driver's steering intention is estimated to be in the range of a high level to a middle level, the switching flag F is set to be one (1).

The process advances to S104. In S104, if the flag F is equal to one (F=1: the driver's steering intention is estimated to be in the range of a high level to a middle level), the process advances to S105. In S105, the first lateral position feedback control unit 20d calculates the first lateral position feedback control value Ifb1 by using the equation (3) mentioned above. Then, the process advances to S106. In S106, the first lateral position feedback control value Ifb1 is set to be the lateral position feedback control value Ifb (Ifb=Ifb1).

In S104, if the flag F is equal to zero (F=0: the driver's steering intention is estimated to be at a low level), the process advances to S107. In S107, the second lateral position feedback control unit 20e calculates the second lateral position feedback control value Ifb2 by using the equation (4) mentioned above. Then, the process advances to S108. In S108, the second lateral position feedback control value Ifb2 is set to be the lateral position feedback control value Ifb (Ifb=Ifb2).

After setting the lateral position feedback control value Ifb in S106 or S108, the process advances to S109. In S109, the yaw angle feedback control unit 20f calculates the yaw angle feedback control amount Ifby that is used to feedback-control the yaw angle of the vehicle so as to set the yaw angle along the target course, by using the equation (7) mentioned above.

Then, the process advances to S110. In S110, the electric power steering motor current value calculation unit 20g calculates the electric motor current value Icmd by using the equation (8) mentioned above. The Icmd is output to the motor drive unit 21 so as to drive the electric motor 12.

Thus, according to the present example of the invention, the feedforward control amount Iff of the electric motor 12 necessary for the vehicle to travel along the target course by the feedforward control is calculated on the basis of the shape of the vehicle travelling path. In the case where the steering torque Td exceeds the predetermined threshold value, the first feedback control is selected. When the vehicle travels in a straight line to the predetermined forward attention point, the first positional deviation amount Δx1 between the vehicle and the target course in the first forward attention point is calculated. The first lateral position feedback control amount Ifb1 necessary for the vehicle to travel along the target course is calculated on the basis of the first positional deviation amount Δx1.

In the case where the steering torque Td is lower than the predetermined threshold value, the second feedback control is selected. The vehicle traveling path of the vehicle is estimated. The second positional deviation amount Δx2 between the estimated vehicle traveling path in the predetermined second forward attention point remote from the first forward attention point and the target course is calculated. The second lateral position feedback control amount Ifb2 necessary for the vehicle to travel along the target course is calculated on the basis of the second positional deviation amount Δx2. The electric motor current value Icmd is calculated by using at least one of the feedforward control amount Iff and the selected feedback control value (one of Ifb1 and Ifb2). The Icmd is output to the motor drive unit 21 so as to drive the electric motor 12.

Accordingly, when the driver entrusts a steering operation to the steering control apparatus, the second feedback control is selected and precise and stable lane keeping control is performed. Also, when the driver inputs a steering operation, the first feedback control is selected and the control is continued while clearly transmitting to the driver a feeling of deviation from the target course without excessively interfering with the driver's operation.

Furthermore, the positions relative to the forward attention point that are used to calculate a positional deviation between the vehicle traveling path and the target course so as to match the control characteristic are set to be different (that is, the first feedback control is set to be performed near the forward attention point and the second feedback control is set to be performed remote from the forward attention point). Accordingly, the first and second feedback controls to be selected can perform the lane keeping control in which rapid tracking toward the target course and stable vehicle behavior when traveling on the target course are desirably balanced.

Although the control amount for the motor drive unit 21 is composed of the feedforward control amount Iff, the feedback control amount (one of Ifb1 and Ifb2), and the yaw angle feedback control amount Ifby in the example of the invention, this is not limited. The control amount calculated by the motor drive unit 21 may include a control amount for performing the feedback control (integral correction) in consideration of a disturbance such as a cant on the vehicle traveling path. Furthermore, the yaw angle feedback control amount Ifby may be omitted.

The invention claimed is:

1. A lane keeping control system for a vehicle that sets a target course on which the vehicle travels, calculates a control amount for an electric power steering motor on the basis of at least an amount of deviation between a traveling path of the vehicle and the target course, and controls the vehicle so as to travel along the target course, the system comprising:
    a first feedback controller that calculates, as a first positional deviation amount, an amount of deviation between the traveling path of the vehicle and the target course at a predetermined first forward attention point when the vehicle travels in a straight line to the predetermined first forward attention point, and that calculates the control amount for the vehicle to travel along the target course in response to the first positional deviation amount;
    a second feedback controller that estimates a traveling path of the vehicle, that calculates, as a second positional deviation amount, an amount of deviation between the estimated traveling path of the vehicle and the target course at a predetermined second forward attention point, and that calculates the control amount for the vehicle to travel along the target course in response to the second positional deviation amount; and
    a control selector that selects one of the control amount calculated by the first feedback control unit and the control amount calculated by the second feedback control unit in response to a driver's steering intention.

2. The lane keeping control system for the vehicle according to claim 1, wherein the second forward attention point is previously set to be remote from the first forward attention point.

3. The lane keeping control system for the vehicle according to claim 1, wherein
    the control selector selects the control amount calculated by the first feedback controller when a steering torque exerted by a driver as the driver's steering intention exceeds a predetermined threshold value; and
    the control selector selects the control amount calculated by the second feedback controller when a steering torque exerted by the driver is lower than the predetermined threshold value.

4. The lane keeping control system for the vehicle according to claim 2, wherein
    the control selector selects the control amount calculated by the first feedback controller when a steering torque exerted by a driver as the driver's steering intention exceeds a predetermined threshold value; and
    the control selector selects the control amount calculated by the second feedback controller when a steering torque exerted by the driver is lower than the predetermined threshold value.

5. The lane keeping control system for the vehicle according to claim 1, wherein the control amount includes a control amount that is output to the electric power steering motor and that is necessary for the vehicle to travel along the target course by feedforward control on the basis of a recognized shape of a vehicle traveling road.

6. The lane keeping control system for the vehicle according to claim 2, wherein the control amount includes a control amount that is output to the electric power steering motor and that is necessary for the vehicle to travel along the target course by feedforward control on the basis of a recognized shape of a vehicle traveling road.

7. The lane keeping control system for the vehicle according to claim 3, wherein the control amount includes a control amount that is output to the electric power steering motor and that is necessary for the vehicle to travel along the target course by feedforward control on the basis of a recognized shape of a vehicle traveling road.

8. The lane keeping control system for the vehicle according to claim 4, wherein the control amount includes a control amount that is output to the electric power steering motor and that is necessary for the vehicle to travel along the target course by feedforward control on the basis of a recognized shape of a vehicle traveling road.

* * * * *